June 8, 1954
R. E. SELTZER
2,680,539
DISTRIBUTOR RELEASE CLUTCH
Filed Feb. 2, 1953
3 Sheets-Sheet 1
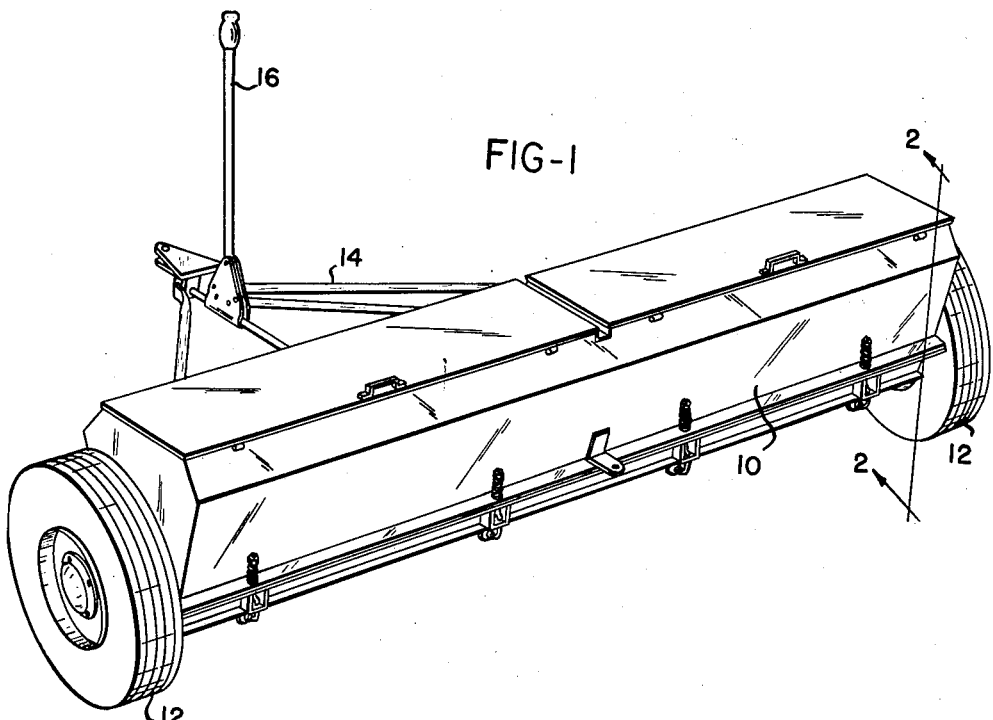
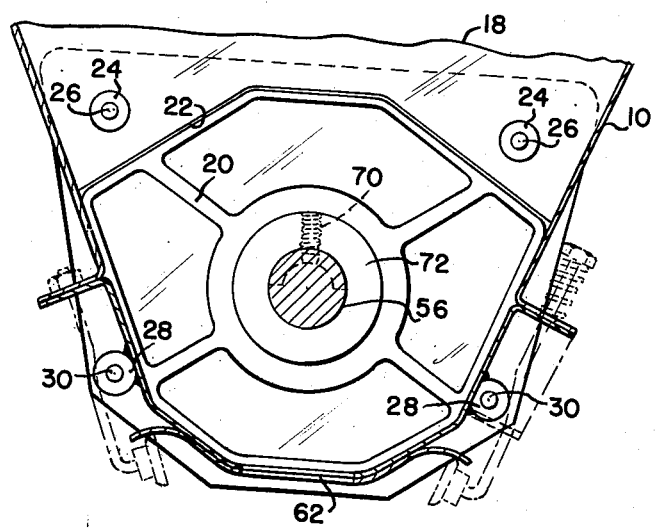
INVENTOR.
ROBERT E. SELTZER
BY *Toulmin & Toulmin*
ATTORNEYS

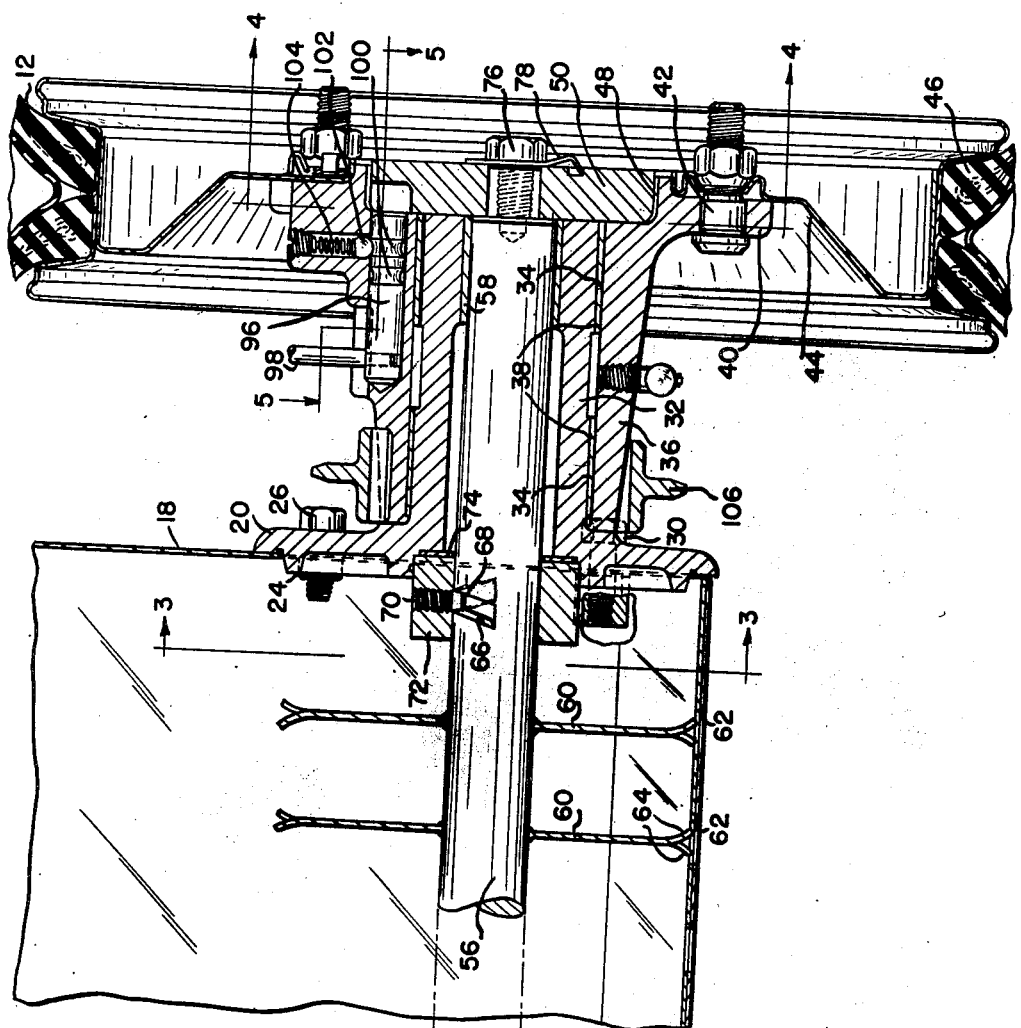
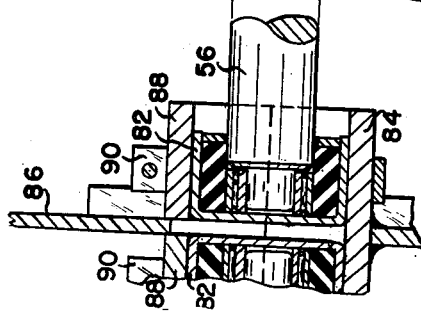

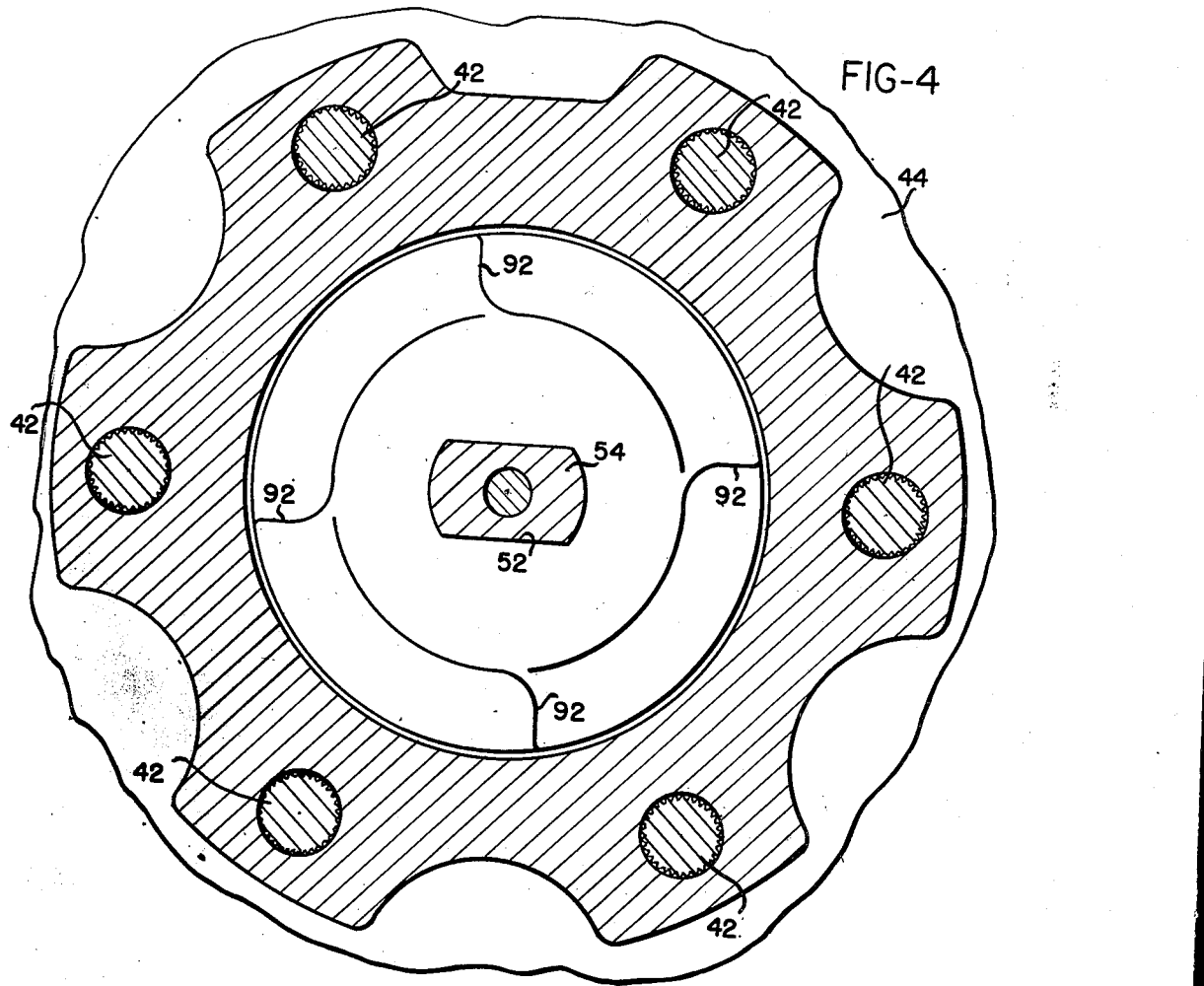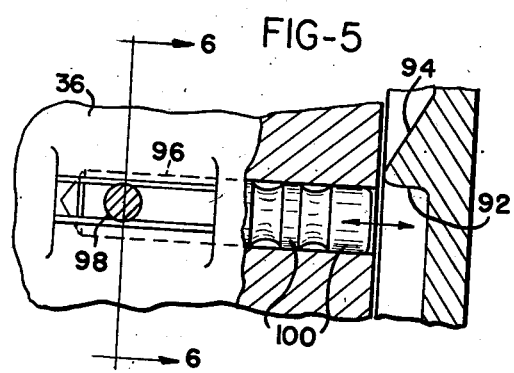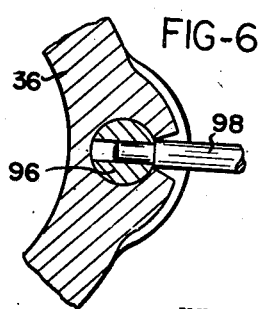

Patented June 8, 1954

2,680,539

UNITED STATES PATENT OFFICE 2,680,539

DISTRIBUTOR RELEASE CLUTCH

Robert E. Seltzer, Bellevue, Ohio, assignor to Spred-All, Inc., Bellevue, Ohio, a corporation of Ohio Application February 2, 1953, Serial No. 334,429

5 Claims. (Cl. 222—177)

This invention relates to agricultural material spreaders and the like and particularly to a novel and improved hub structure therefor and a clutch mechanism associated with the hub structure.

In general, a distributor of the nature with which this invention is concerned and designed is for the purpose of distributing chemical fertilizers and other soil treating or conditioning substances at a predetermined rate as the distributor is drawn over the ground. Among the problems that have arisen in connection with such distributors is the one of insuring a proper feed of all of the various types of materials that may be dispensed or distributed by the device. Such materials will range from relatively hard finely pulverulent material that will flow freely under all conditions to rather soft flaky substances that tend to become sticky in moist weather. Also, the materials will vary widely as to the amounts that must be dispensed, ranging from about twenty-five pounds per acre to several hundred pounds per acre for different materials.

Because of the widely varying nature of the materials that the distributor must handle and the great difference in amounts that must be distributed per unit area, it is essential for the distributor to embody feeding devices that are substantially positive in operation and which are capable of close regulation. Such a feeding device is disclosed in my co-pending application Serial No. 272,588, filed February 20, 1952 and assigned to the same assignee as the instant application.

In the co-pending application referred to above the feeding device consists of a disc rotatable within the hopper of the distributor having peripheral teeth bent outwardly on opposite sides of the plane of the disc and extending part way through the feed openings in the bottom of the hopper and running close to the edges of the feed opening. It will be evident that with an arrangement of this nature, it is essential for the feeding discs to be accurately located relative to the feed openings and heretofore it has been somewhat difficult to accomplish this adjustment with the desired degree of accuracy while still maintaining economical manufacturing procedures in the production of the distributor.

Accordingly, one of the primary objects of the present invention is the provision of an arrangement whereby the feeding elements in a distributor of the nature referred to can be accurately positioned relative to the feed openings of the hopper whereby precisely the proper feeding action is had at all times.

Another object of this invention is the provision of an improved hub structure for supporting the ground wheels of a distributor of the nature referred to on the hopper thereof and which hub structure embodies devices for effecting a precise axial adjustment of the agitator shaft within the hopper and on which shaft are located the feeding discs or elements of the distributor mechanism.

Inasmuch as some of the materials which are dispensed from a distributor for agricultural purposes are extremely expensive it becomes important to be able to halt the feeding of the distributor when it is necessary to move the distributor from one location to another.

With this in mind a still further object of this invention is the provision of a novel clutch mechanism for selectively connecting and disconnecting the ground wheels of the distributor of the agitator shaft thereof.

A still further object is the provision of a clutch arrangement of the nature referred to which can be disengaged without the driver of the tractor that is drawing the distributor dismounting from the tractor.

These and other objects and advantages of the invention will appear more clearly in the following specification in connection with the accompanying drawings, in which:

Figure 1 is a perspective view showing a distributor of the nature referred to adapted for being provided with the structure of the present invention;

Figure 2 is a partial sectional view through one of the hubs of the distributor and is indicated by line 2—2 on Figure 1;

Figure 3 is a sectional view indicated by line 3—3 on Figure 2;

Figure 4 is a sectional view indicated by line 4—4 on Figure 2;

Figure 5 is a fragmentary sectional view indicated by line 5—5 on Figure 2; and

Figure 6 is a sectional view indicated by line 6—6 on Figure 5.

Referring to the drawings somewhat more in detail and in particular to Figure 1, the distributor with which the present invention deals consists of a hopper having ground wheels 12 at the opposite ends and which ground wheels drive shaft means within the hopper end on which shaft means there are mounted the feeding discs or elements within the hopper that cause the material to be dispensed to be discharged therefrom.

The distributor is provided with a hitch mechanism 14 extending from the front side thereof to which can be connected a suitable draft means such as a tractor. The hitch mechanism may also provide support for the adjusting mechanism represented by lever 16 which serves to vary the effective sizes of the feed openings in the bottom of the hopper to regulate the rate of discharge of material therefrom.

Turning now to Figure 2 this figure is a vertical section through the right end of the structure of Figure 1 and in Figure 2 it will be noted that the right end wall 18 of the hopper supports a hub 20. The right end wall 18 has an opening therein as will best be seen at 22 in Figure 3 and the hub 20 has a boss thereon that substantially fits within the said opening. The end wall 18 is provided with nuts 24 which receive bolts 26 that fasten the hub to the end wall while on opposite sides of the hopper bottom at the end thereof there are secured the nuts 28 that receive the bolts 30 thus providing further support for the hub on the end of the hopper.

Hub 20 has an outwardly extending cylindrical part 32 having the spaced bearing areas 34 thereon on which is rotatably mounted an outer rotatable hub part 36 by means of the sleeve bearings 38.

Outer hub part 36 terminates at its outer end in a radial flange 40 adapted for receiving wheel bolts 42 that support a pressed steel wheel 44 on which tire 46 is mounted.

The outer hub 36 also has a recess 48 in its outer end and mounted therein is a circular drive element 50.

Turning now to Figure 4 in connection with Figure 2 it will be observed that drive element 50 has a flat sided aperture 52 therein that receives the correspondingly shaped end 54 of agitator shaft 56 that extends through inner hub 20 and which is journaled in the outer end of cylindrical portion 32 thereof by sleeve bearing 58.

Inside hopper 10 shaft 56 has fixed thereto the feeding elements or agitator blades 60 each of which registers with a feed opening 62 in the bottom of the hopper. Each agitator blade comprises the teeth 64 that extend part way through the associated feed opening 62 and which run closely adjacent the side edges of the said opening.

In order to provide for precise axial adjustment of shaft 56 in the hopper, the shaft is provided inwardly from the inner end of hub 20 with a helical groove 66. Groove 66 is adapted for receiving the correspondingly shaped end 68 of a screw 70 in a collar 72. Collar 72 is partially received within a fairly close fitting cylindrical recess in the inner face of hub 20 and abuts a thrust washer 74 at the bottom of said recess. It will be apparent that rotation of collar 72 relative to shaft 56 which can be accomplished by slightly loosening screw 70 will bring about relative axial movement between shaft 56 and hub 20 whereby the said shaft can be axially adjusted within the hub.

The drive element 50 is availed of to cooperate with collar 72 in holding shaft 56 in adjusted axial position and this is accomplished by employing the cap screw 76 and locking washer 78 to hold drive element 50 in the proper position on the end of shaft 56.

The shaft 56 extends one-half the length of hopper 10 and a corresponding shaft along the other half of the hopper is driven by the other ground wheel. This arrangement permits differential movement between the ground wheels when the distributor is being turned so that the wheels do not slip.

At the inner end of shaft 56 a bearing structure is employed consisting of the needle or roller bearing 80 supported in the rubber-like sleeve 82 that also fits closely about the shaft beyond the said bearing and protects the said bearing against the ingress of foreign material thereto. Sleeve 82 is supported on the half-round supporting bracket 84 that is welded to the center panel 86 of the hopper. The removable half-round top 88 of the hopper retains sleeve 82 in position by virtue of cap 89 that surrounds the assembly.

Referring now to Figures 2, 4, 5, and 6, it will be observed that drive element 50 on the side thereof toward the hopper is provided with four substantially radial and axially extending drive surfaces 92 each of which has associated therewith a relatively steep approach cam 94.

The drive surfaces 92 are availed of for establishing driving connection between the inner and outer hubs through the medium of a drive pin 96 mounted within an axial bore in outer hub 36 and axially shiftable therein between a retracted position in which it is shown in Figures 2 and 5 and where no drive connection exists between the inner and outer hubs, and an inner position in which the end of the drive pin is engaged by the adjacent one of the drive surfaces 92 and under which conditions a positive driving connection exists between the inner and outer hubs. The pin 96 is provided with a shifter 98 at the end adjacent the hopper and toward its other end the pin has the spaced grooves 100 adapted for receiving the ball 102 mounted in a radial bore in the outer hub and spring urged toward pin 96 by compression spring 104. Spring pressed ball 102 together with grooves 100 act as a detention to retain the pin 96 in either of its two shifted positions.

The described arrangement is such that when the pin 96 is shifted manually to its drive position, a driving connection will be established between the ground wheel and the associated agitator shaft 56 which will obtain throughout continuously forward motion of the distributor and for at least short reverse movements of the distributor. However, any time it is desired to release the driving connection between the ground wheel and its adjacent shaft, this can be done either by manually shifting pin 96 to its Figures 2 and 5 positions or by backing the distributor so that the ground wheel makes at least one-quarter of a revolution and during which revolution the pin 96 will ride up the approach cam 94 of the next adjacent driving surface 92 and will be snapped to its Figures 2 and 5 positions thus disconnecting the ground wheel from its agitator shaft. It will be apparent that while drive member 50 has been illustrated with four drive surfaces 92 thereon, it could be provided with a greater or lesser number thereof if so desired and the same mode of operation would obtain.

The hub structure of this invention together with the clutch which is described can also be utilized to advantage in driving auxiliary agitator shafts within the distributor hopper where auxiliary devices are associated with the distributor such as an extra feeding attachment that might be supported on the back of the hopper. This is done by forming splines on the inner end of the outer hub and mounting thereon a sprocket 106 over which a chain can be passed for effecting the driving connection referred to. Inasmuch as the outer hub is always rotating when the dis tributor is moving, it will be evident that the distributor portion of the device could be made inoperative by moving pin 96 to its Figure 2 position but this will not effect the driving connection between sprocket 106 and whatever it is connected to.

The hub structure according to my invention has a still further advantage in that the pressed steel wheel 44 can be reversed and a substantial difference in the wheel spacing of the distributor can thus be had which will accommodate it to all conditions as, for example, where it might be desired to distribute fertilizer and weed killer or other soil treating or conditioning materials over an area already planted with crops in rows.

It will be understood that this invention is susceptible to modification in order to adapt it to different usages and conditions, and, accordingly, it is desired to comprehend such modifications within this invention as may fall within the scope of the appended claims.

I claim:

1. In an agricultural material distributor; a hopper, a stationary hub secured to the end of the hopper, an agitator shaft extending from the hopper through said stationary hub, a rotatable outer hub rotatable on the inner hub and adapted for supporting a ground wheel, a drive disc secured to the end of said shaft and extending radially outwardly so as to overlie the end of said outer hub thereby to retain said outer hub on said stationary hub, a pin reciprocably mounted in said outer hub, notch means in said disc for receiving the end of said pin, one end of said notch means having a substantially axial wall so that movement of the rotatable hub to move the pin against the said wall will effect driving connection between the outer hub and the shaft, and the other end of said notch means comprising an inclined wall whereby movement of the outer hub in the opposite direction will bring about camming of said pin away from its driving position.

2. In an agricultural material distributor; a hopper, a stationary hub secured to the end of the hopper, an agitator shaft extending from the hopper through said stationary hub, a rotatable outer hub rotatable on the inner hub and adapted for supporting a ground wheel, a drive disc secured to the end of said shaft and extending radially outwardly so as to overlie the end of said outer hub thereby to retain said outer hub on said stationary hub, a pin reciprocably mounted in said outer hub, notch means in said disc for receiving the end of said pin, one end of said notch means having a substantially axial wall so that movement of the rotatable hub to move the pin against the said wall will effect driving connection between the outer hub and the shaft, and the other end of said notch means comprising an inclined wall whereby movement of the outer hub in the opposite direction will bring about camming of said pin away from its driving position, there being spaced recesses in said pin and spring pressed means carried by the outer hub engageable with said recesses for releasably retaining said pin in its two positions.

3. In combination; a hopper, a hub secured to one end of the hopper comprising a flange portion directly connected with the hopper and a cylindrical portion extending outwardly from the hopper, a rotatable outer hub journaled on said cylindrical portion and abutting the flange portion of said stationary hub, the outer ends of said hubs comprising co-planar end surfaces, an agitator shaft in said hopper extending through said stationary hub, a drive disc non-rotatably mounted on the outer end of said shaft and extending outwardly so as to overlie the end surfaces of said hubs, interengageable elements of a one-way drive clutch carried by said rotatable hub and said drive disc, a collar on said shaft inside said stationary hub, a spiral groove in said shaft inside said collar, a set screw in said collar having its end engaging said groove for permitting axial adjustment of the collar on the shaft, and means for securing said drive disc on the outer end of said shaft in a plurality of adjusted axial positions thereon.

4. In an agricultural material distributor; a hopper, a stationary hub secured to the end of the hopper, an agitator shaft extending from the hopper through said stationary hub, a rotatable outer hub rotatable on the inner hub and adapted for supporting a ground wheel, a drive disc secured to the end of said shaft and extending radially outwardly so as to overlie the end of said outer hub thereby to retain said outer hub on said stationary hub, a pin reciprocably mounted in said outer hub in a direction parallel to said agitator shaft, a plurality of spaced recesses having pin engaging surfaces adapted selectively in said disc for receiving the end of said pin, whereby movement of the rotatable hub will drive the agitator shaft upon engagement of said pin by one of said pin engaging surfaces, and means for withdrawing said pin from said pin engaging surfaces.

5. In an agricultural material distributor; a hopper, a stationary hub secured to the end of the hopper, an agitator shaft extending from the hopper through said stationary hub, a rotatable outer hub rotatable on the inner hub and adapted for supporting a ground wheel, a drive disc secured to the end of said shaft and extending radially outwardly so as to overlie the end of said outer hub thereby to retain said outer hub on said stationary hub, a pin reciprocably mounted in said outer hub in a direction parallel to said agitator shaft, a plurality of circumferentially spaced pin drive surfaces in said disc for receiving the end of said pin whereby movement of the rotatable hub will drive the agitator shaft when said pin is in engagement with one of said circumferentially spaced pin drive surfaces in said disc, and means for withdrawing said pin from one of said circumferentially spaced pin drive surfaces.

References Cited in the file of this patent

UNITED STATES PATENTS

| Number | Name | Date |
|---|---|---|
| 616,298 | Dykes | Dec. 20, 1898 |
| 1,650,808 | Van Brunt | Nov. 29, 1927 |
| 1,670,645 | Worthington | May 22, 1928 |
| 1,728,685 | Layne | Sept. 17, 1929 |
| 1,773,607 | Vandecan | Aug. 19, 1930 |
| 2,469,483 | Strong | May 10, 1949 |
| 2,504,787 | Bailey | Apr. 18, 1950 |
| 2,511,514 | Rosselot | June 13, 1950 |
| 2,558,352 | Gandrud | June 26, 1951 |
| 2,563,773 | Fasoli | Aug. 7, 1951 |
| 2,603,383 | Wilson | July 15, 1952 |